Nov. 17, 1959   R. H. WOODWARD ET AL   2,912,761
AUTOMATIC MAPPING DEVICE
Filed Nov. 1, 1955   5 Sheets-Sheet 1
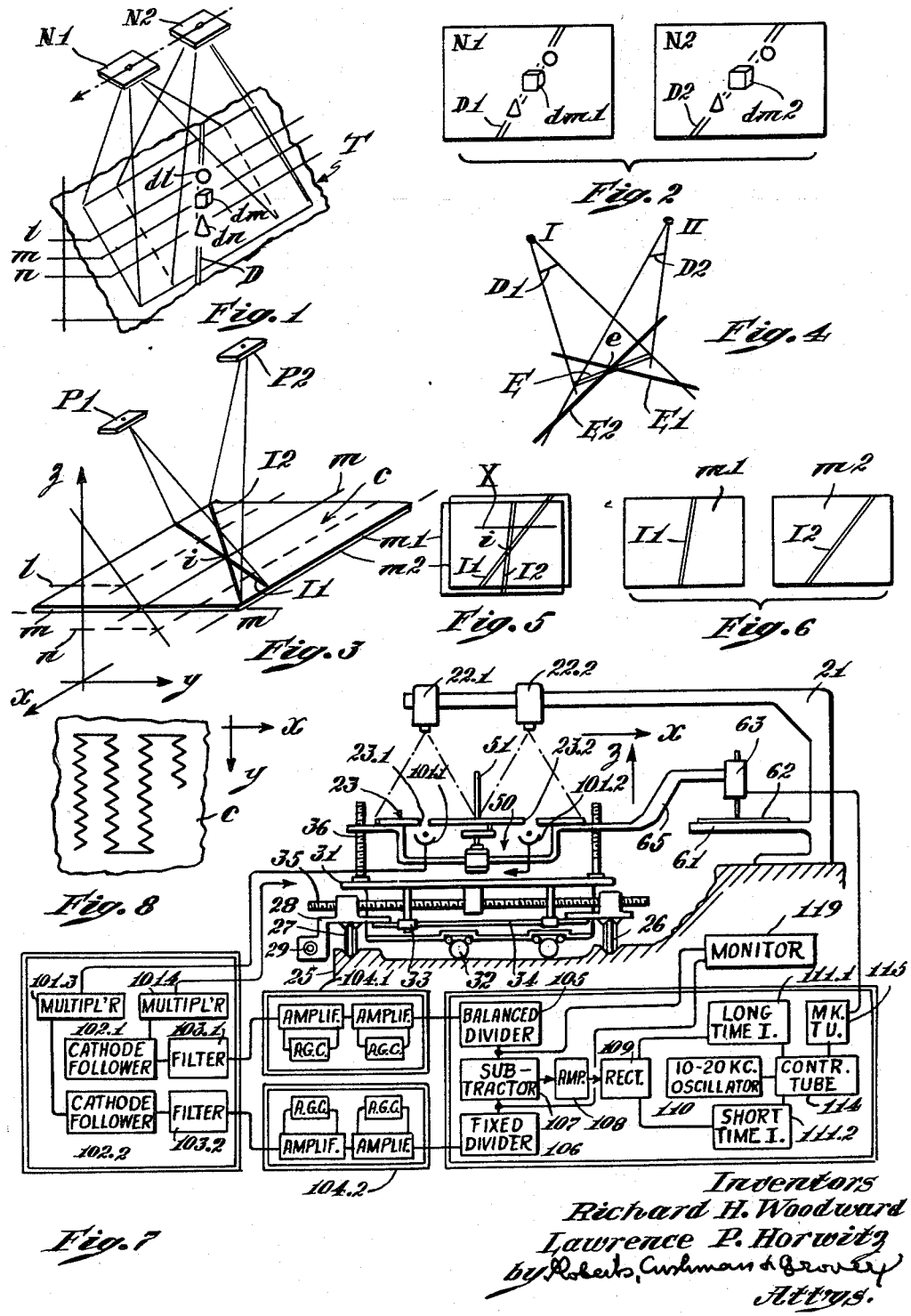
Inventors
Richard H. Woodward
Lawrence P. Horwitz
by Roberts, Cushman & Brown
Attys.

Inventors
Richard H. Woodward
Lawrence P. Horwitz
by Roberts, Cushman & Grover
Attys

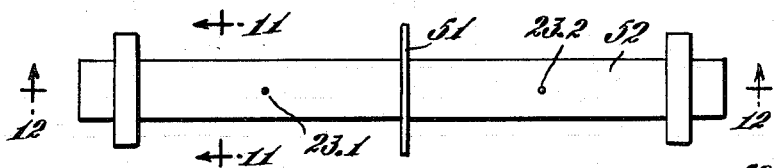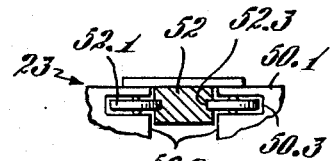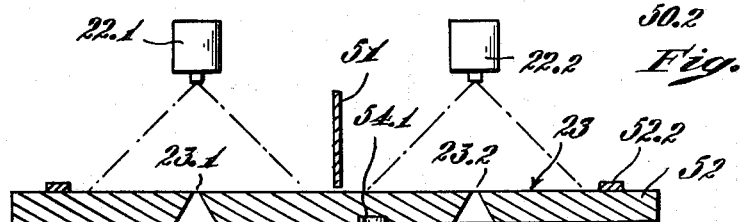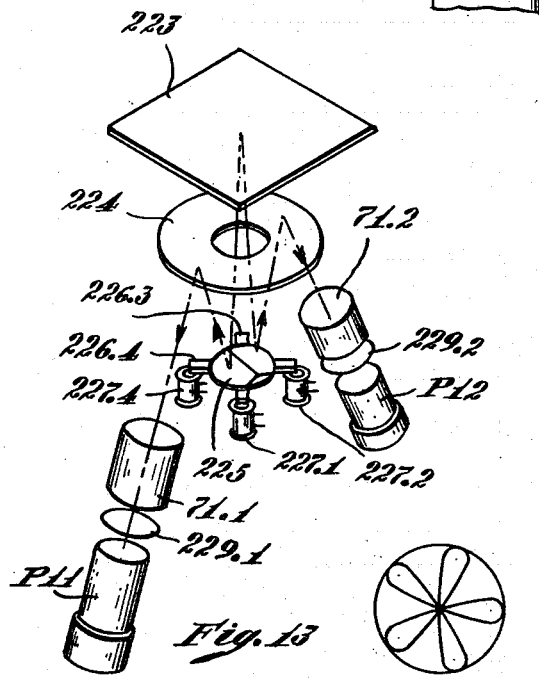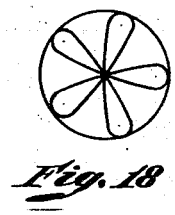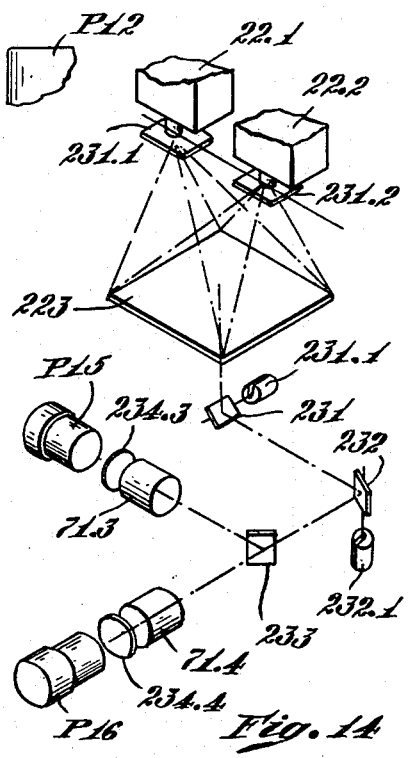

Inventors
Richard H. Woodward
Lawrence P. Horwitz
by Roberts, Cushman & Grover
Attys

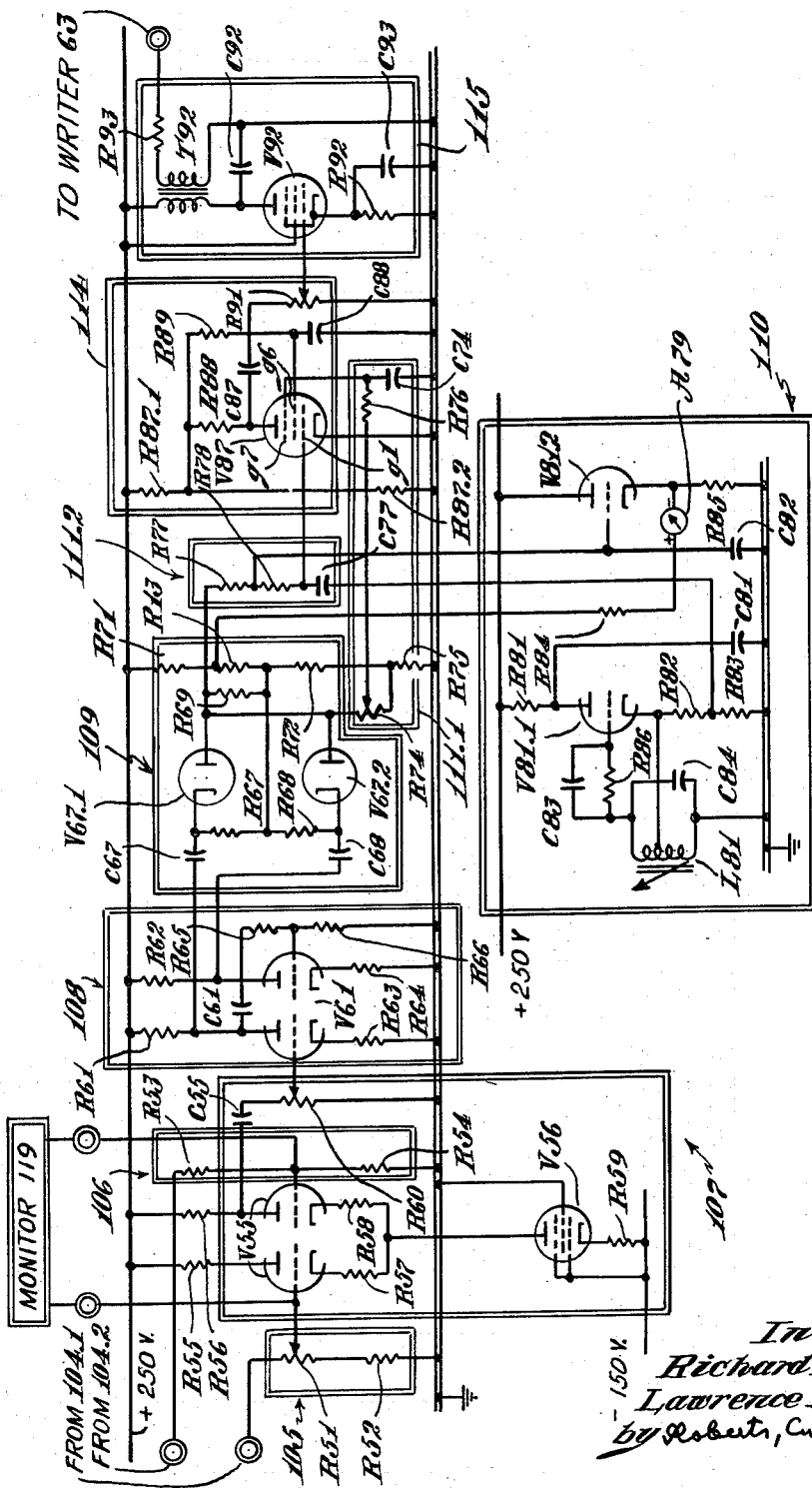

United States Patent Office 2,912,761
Patented Nov. 17, 1959

2,912,761

AUTOMATIC MAPPING DEVICE

Richard H. Woodward, Belmont, and Lawrence P. Horwitz, Watertown, Mass., assignors to Pickard & Burns, Inc., Needham, Mass., a corporation of Massachusetts Application November 1, 1955, Serial No. 544,208

18 Claims. (Cl. 33—20)

The present invention relates to the plotting of topographical maps from pairs of geometrically related photographic records.

It is one of the principal objects of the invention to derive fully automatically from such photographs a map containing contour lines of the terrain at selected elevations, without any mental activity either purely observational and by reflex action or involving reasoning activities, with optimum accuracy, and with exclusion of substantial falsification or misleading interpretation of the original photographs, at a speed that is superior to any that can be obtained with heretofore suggested techniques, with apparatus that is rugged and reliable as well as compact and simple in operation, and which apparatus is easily adaptable to various modes of detection, and derivation of the final map from the original photographic records.

Other important objects are to provide a mapping device of this type whose mechanical components are interrelated for relative movement in a simple rugged manner but nevertheless providing operation with an exactness that is commensurate with that of the optical and electrical components which are correlated therewith, and to provide such a device that incorporates photoelectrical scanning devices and electronic signal modifying devices which permit optimum evaluation of the information contained in the photographs.

Another practically very important object is to provide a method and devices for scanning small record areas, which are especially suitable for discriminating between congruence and discrepancy of such areas, and which are especially suited for apparatus of this general nature.

A brief summary of this invention in various aspects, indicating its nature and substance for attaining the above objects, is as follows:

In accordance with the invention, two geometrically related images projected from copies of the original photographs, which have been aligned by conventional methods, are scanned, each image individually, by means of two photoelectric scanners, one for each image, which scanners are moved in alignment through the image area in a large scale or gross movement within a given plane and which at the same time execute synchronized small scale or fine movements covering elementary comparison areas, which movements can be uni- or multi-directional, and which can be within the above mentioned gross scanning plane, or inclined thereto; the information patterns due to the fine scanning of the elementary areas contrast or agree in accordance with the optical discrepancy or similarity of such areas if they do not, or do originate from one and the same area of the original terrain; the photoelectric scanners convert the optical patterns into electrical signals which carry the information in terms of wave patterns; these signals from corresponding elementary areas are amplified and compared, the difference signal is integrated, and if below a predetermined value is then used to provide a mark on a mapping surface; this mark will then denote a point of the contour line in a plane of elevation which corresponds to the scanning plane wherein the scanners operate; the elevation can be selected by suitably adjusting the relation of the elementary comparison areas with the projected image.

In another aspect of the invention, the means for fine scanning elementary image areas is accomplished by a coupled movement of scanning apertures which is superimposed on the gross scanning movement; in a very important practical aspect of the invention, this scanning movement is in a pattern that includes lines which intersect near or at the center of the elementary area that is scanned.

In a further aspect of the invention, the fine scanning means are correlated with two photoelectric detecting means one for and juxtaposed to each of two apertures of these scanning means, for qualitatively detecting the image detail pattern consecutively presented to them by the apertures thus converting the scanned detail pattern into an electric signal wave pattern; with these photoelectric detecting means are combined two electric transmission means one for each detecting means, for delivering respective electrical waves representing the variations of the image detail pattern presented by the apertures to the respective detecting means during the gross and fine scanning movements; these means are further combined with means for continuously comparing the signal waves, and with means controlled by the comparing means for energizing marking means upon indication by the comparing means of signal wave similarity within a given uncertainty range; the means are directly or indirectly such as by a servo system coupled to the gross scanning means for marking selected points on a mapping surface; any point marked on the mapping surface will then correspond to elementary areas that are nearly congruent in both images and depict an elementary terrain area in a given contour plane; hence the point and similarly marked points derived from scanning within a given image plane will depict the terrain contour of the corresponding elevation.

Other objects, and aspects of novelty in addition to those contained in the above summary of the nature and the objects of the invention will appear from the herein presented outline of its principles, its mode of operation, and its practical possibilities together with a detailed description of a practical embodiment including various modifications, illustrating its novel characteristics. These refer to drawings in which Fig. 1 is an axonometric diagram illustrating the taking of the original, geometrically correlated photographic records;

Fig. 2 is a schematic view of two correlated photographs such as obtained according to Fig. 1;

Fig. 3 is a diagram similar to Fig. 1, illustrating the geometrical relation of the original terrain with the original photographic records, as well as of the diapositives derived from the original photographs and of the three dimensional images projected therefrom;

Fig. 4 is a geometric diagram further illustrating the manner in which the two correlated three dimensional images are projected from the photographic diapositives;

Fig. 5 is a view of one of the contour planes indicated in Fig. 4;

Figure 9:
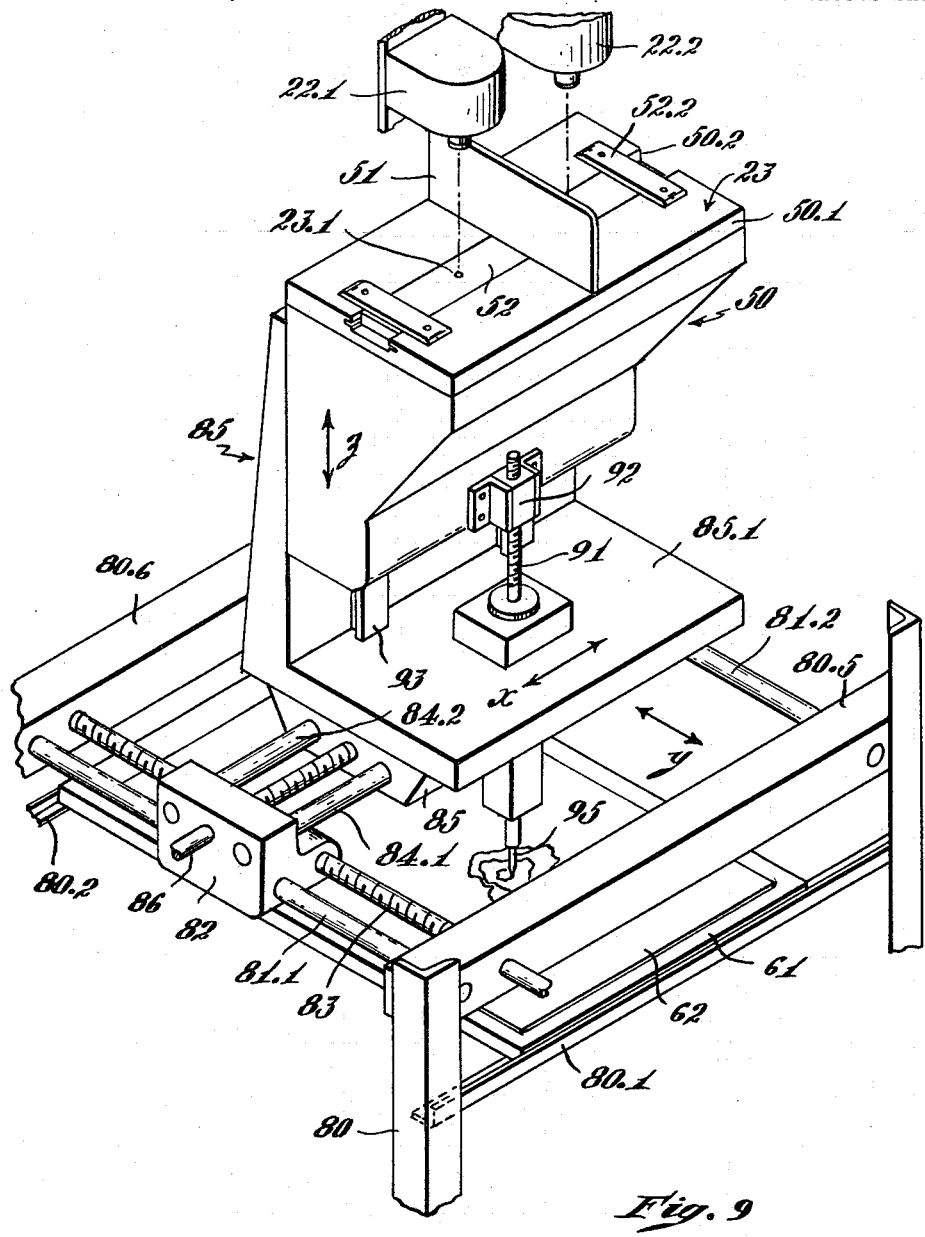
Figure 16:
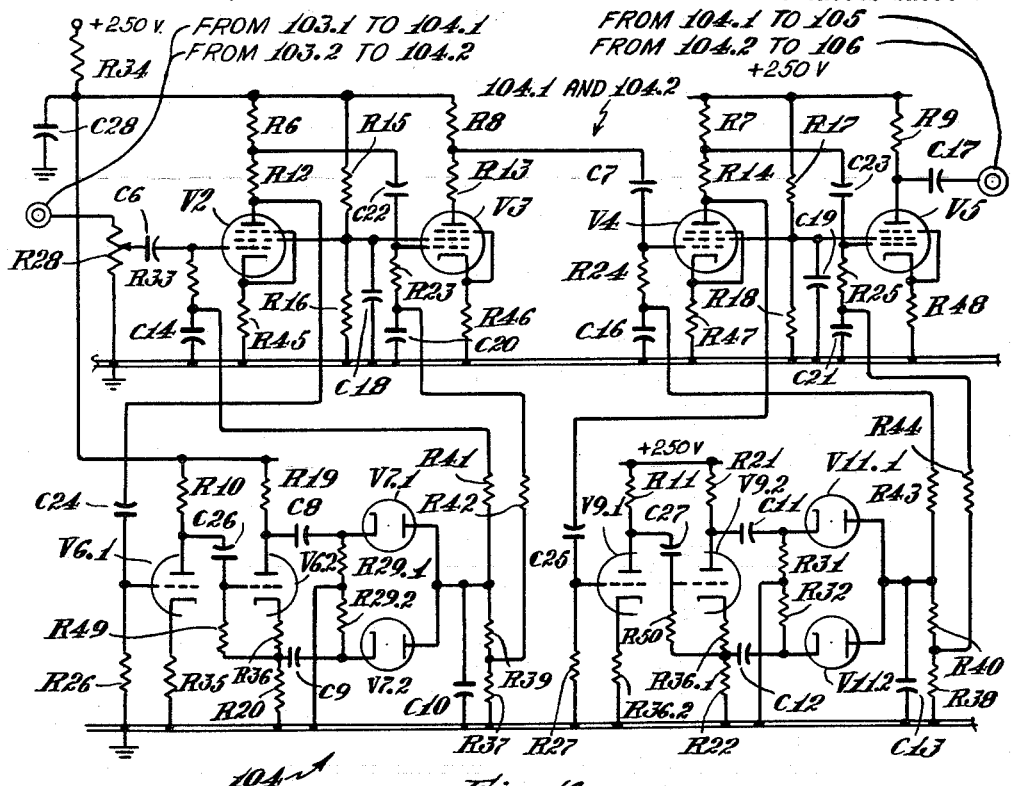
Figure 15:
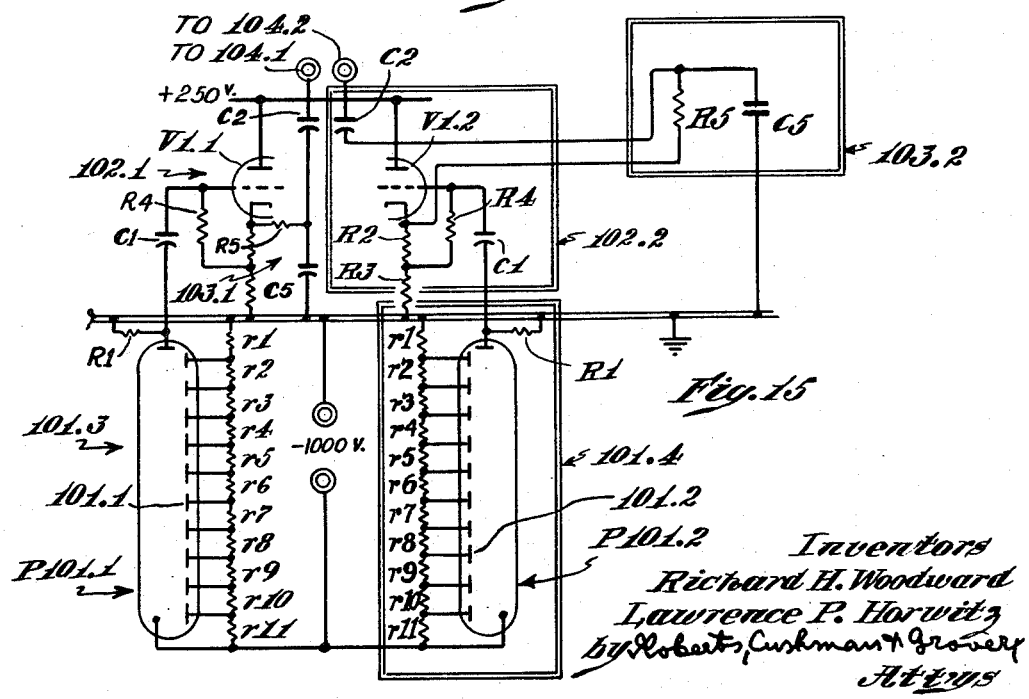

Fig. 6 indicates the two superimposed images of Fig. 5, separated for purposes of the herein described embodiment of the invention;

Fig. 7 is a schematic representation of the entire herein described apparatus, including the optical, mechanical and electronic equipment;

Fig. 8 is a diagram illustrating the gross and fine scanning movements carried out in apparatus according to Fig. 7;

Fig. 9 is an axonometric view of the mechanical and optical components of a device according to the invention;

Fig. 10 is a front elevation of one embodiment of a fine scanning device according to the invention;

Fig. 11 is a section on lines 11—11 of Fig. 10;

Fig. 12 is a section on lines 12—12 of Fig. 10;

Fig. 13 is a diagrammatical axonometric representation of a modification of the fine scanning equipment;

Fig. 14 is an axonometric diagram similar to Fig. 13, of a third modification of the fine scanning equipment;

Figs. 15, 16 and 17 are circuit diagrams illustrating the construction of the correspondingly labeled circuit blocks of Fig. 8; and Fig. 18 illustrates a fine scanning pattern in exaggerated scale obtainable by means of apparatus according to Figs. 13 and 14.

The following description of a typical embodiment, with various modifications, of the invention—including components which are particularly suited for purposes of the present invention but have more general usefulness—will present (1) An outline of the geometrical principles on which the present invention is based, so far as necessary for an understanding thereof and for establishing a terminology for the description and the claims;

(2) A general description of the apparatus as well as method aspects of the invention, with particular reference to Fig. 7 which includes diagrams of the optical and mechanical components as well as a block diagram of the circuitry;

(3) A more detailed description of the optical, mechanical and electrical components of a specific embodiment of the device;

(4) A detailed description of the operation of that embodiment; and (5) A description of the construction and operation of certain modifications of the principal embodiment.

OUTLINE OF PHOTOGRAPHIC PRINCIPLES

Fig. 1 indicates at T a portion of inclined natural terrain, incorporating detail objects . . . $dl$, $dm$, $dn$ . . . in planes of elevation . . . $l$, $m$, $n$ . . . the different configurations of the elementary areas of the terrain being schematically indicated. Photographic negatives N1 and N2 are obtained in well known manner, for example by means of a camera carried by aircraft. For the purpose of simplifying the following explanation, particular consideration is given to detail that occurs along an obliquely inclined line D but it will be understood that the same consideration applies to detail anywhere in the terrain. An elementary area $dm$ of the terrain T will photograph on negatives N1, N2 in terms of elementary area patterns $dm1$, $dm2$, respectively, as shown in Fig. 2. The detail areas in line D will photograph in lines D1, D2 of the negatives.

The negatives are reduced to transparencies, for example diapositives, suitable for projection, and these are indicated at P1, P2 of Fig. 3. This figure indicates in extremely simplified manner the way in which the two correlated images are projected from diapositives P1 and P2. The projectors are not shown, and each ray bundle is represented by a ray fan indicated by two rays that generate series of coplanar lines. The projectors are oriented to duplicate the relative positions of the camera during exposure of negatives N1 and N2 respectively. The ratio of object sizes in the diapositives, in the projected images and in the actual terrain can be easily determined, for equal as well as different ray angles during taking and projection, respectively. In the present description it is assumed that these angles are the same for taking and projecting, so that Fig. 4 represents both taking and projecting conditions, lines E1, E2 being examples of the above mentioned lines which are defined by two rays one each from points I and II which points represent the negatives as well as the diapositives. An elementary area $e$ corresponds to a terrain element such as $dm$ as well as to its projected images, and it will be evident that point $e$ defines a certain elevation for which the ray pencils from each projector which are peculiar to this terrain area intersect whereas for all other elevations there is no intersection of rays depicting that particular area. The terrain is in this fashion reproduced by two images; image points where ray pencils that project essentially similar elementary images intersect, define corresponding points of the terrain.

It will now be evident that in the image space of Fig. 3, lines I1 and I2 in plane $m$ of Fig. 3 correspond to lines E1, E2 of Fig. 4 and hence to lines D1, D2 of Fig. 2 and that point $e$ of Fig. 4 corresponds to an elementary area $dm$ of Fig. 1, to elementary areas $dm1$ and $dm2$ of Fig. 2, and to point $i$ of Fig. 3. Point $i$ is located in the plane of elevation $m$ and this plane is that of Fig. 5 which indicates that any particular elevation, such as $m$, is represented by two superimposed image sheaves, here $m1$ and $m2$, one from each projector. In any plane of elevation, elementary image areas of one and the same terrain area, with nearly similar patterns, coincide only if that terrain area is in that elevation; in terms of line D of Fig. 1 only the images of detail $dm$ coincide in the projection space at the intersection of lines I1 and I2, whereas, the images of $dn$ or $dl$ are on distinct points on these lines. Similarly, the images in lines through $i$ obliquely to the plane of elevation, represent different terrain areas. Thus, if a given image plane is scanned to detect a point where the two elementary images from the respective projectors are more nearly identical than at any other point, that point will be located in a given predeterminable elevation defined by the scanning plane, and a series of such points will define a contour line therein. The separate scanning for such points of two superimposed images is the general purpose of the present invention.

It is feasible to scan two superimposed images for similarity of corresponding elementary areas if the images are rendered distinct for example by projecting them in different colors or with cross polarized light, the scanning devices being equipped with corresponding discriminating filters or analyzers as will be explained more in detail with reference to Figs. 13 and 14. However, unless the images have to be superimposed for convenient visual inspection, it is unnecessary to introduce such discriminating devices because the two images can be spatially separated if the two scanning means are correspondingly separated. This arrangement, used in the embodiment herein described, is schematically indicated in Fig. 6 which shows the two image planes $m1$ and $m2$ side by side.

The image planes referred to hereinafter correspond either to the two sheaves of Figs. 3 and 5, or to the separate planes of Fig. 6.

Fig. 5 indicates that two scanning means moving say in line Y and directed at the same point of the superimposed image sheaves (or in Fig. 6 at corresponding points of the two juxtaposed images) could not possibly detect nearly identical elementary image patterns whereas, if the scanning means moves in a path, through $i$, this point would be detected as lying in elevation $m$. Similarly, if the two scanning means move in paths that are inclined to the image plane, they will again indicate nearly identical image areas only if these areas are in the predetermined plane of elevation.

In the following description, the axes $x$, $y$, $z$ will be referred to as indicated in Fig. 3, axes $x$ and $y$ defining an image plane of a given elevation and axis $z$ a direction or movement normal thereto.

GENERAL DESCRIPTION

Fig. 7 indicates at 21 a supporting frame work that carries two projectors 22.1, 22.2 of conventional design, which project from diapositives P1, P2, the above described juxtaposed images. The plane of elevation can be selected by means of an opaque platen indicated at 23 that is adjustable in the $x$, $y$ and $z$ directions as follows.

A table 25 which is rigidly connected with the projector carrier 21 has tracks 26 which support in known manner, by means of guide bearings 27, a lower carriage 28 which can be moved in the $y$ direction by means of a lead screw 29 that is axially fixed relatively to the frame. A second, upper carriage 31 is supported on table 25 by means of ball rollers 32 only two of which are indicated although it will be understood that at least three of these such bearings are required. The carriage 31 has guide rollers 33 which confine the travel of table 31 along the guides 34 of the lower carriage 28. It will be understood that two carriage guides 34 are provided and that two pairs of rollers 33 are correlated with each guide. The upper carriage 31 is moved in the X direction by means of a lead screw 35 that runs in inside threads provided on carriages 28 and 31. The drives for the lead screws 29 and 35 are not shown but it will be understood that they can be of any conventional design, such as electrical motors provided with tachometers. A third carriage or table is provided by the platen 23 which is supported on the upper carriage 31 by means of three lead screws 36 which are driven by suitable means such as a motor.

To the platen 23 is fastened a fine scanning head 50 which will be described more in detail hereinbelow with reference to Figs. 9 to 14. A septum 51 separates the platen areas for the two images that are projected from projectors 22.1 and 22.2 respectively. Fig. 8, again to be referred to hereinbelow, indicates the total scanning path composed of the gross scanning movements on the $x$ and $y$ axes, and the fine scanning movement provided by the device 50.

The support 21 also carries a recording surface table 61 on which is fastened a mapping sheet 62. A recording stylus actuator 63 is in suitable manner fastened to the platen structure 50, as indicated at 65 of Fig. 8.

Within each fine scanning heads 50 is a multiplier phototube indicated by cathodes 101.1, 101.2 having conventional auxiliary supply circuits indicated at 101.3 and 101.4, respectively. The modulated signal currents are translated into signal voltages in identical cathode follower circuits 102.1, 102.2. From there the signals pass to identical filters 103.1, 103.2 and from there to two identical automatic gain control amplifier aggregates 104.1, 104.2. The amplifiers feed into voltage dividers, a balanced divider 105 and a fixed divider 106. The dividers are connected to a subtractor 107 that feeds through an amplifier 108 into a rectifier 109. The rectifier supplies timing devices, a long time constant device 111.1 and a short time constant device 111.2. Both timers feed into the control tube 112 which in turn controls a marker tube 115 for energizing the marker magnet 63. A monitoring circuit 119 that includes suitable oscilloscope means, is supplied from the outputs of dividers 105 and 106.

DETAIL DESCRIPTION

The optical equipment consists, as mentioned above and as shown in Figs. 9 and 12 to 14, of the two projectors 22.1 and 22.2 of conventional design which are adjustably fixed to a support 21 and which project transparencies, such as diapositives P1, P2, towards the adjustable platen 23. The scanning holes 23.1 and 23.2, which can be considered to be part of the optical equipment, are applied to a slide or similar structure which will be described hereinbelow. The spacing of the holes corresponds to, but is not necessarily equal to the displacement of the projectors and the images. The photoelectric detectors, which can also be considered part of the optical equipment, are indicated in Fig. 7 by their cathodes 101.1 and 101.2. These cathodes are components of the phototubes indicated at P11 and P12 of Fig. 12, P13 and P14 of Fig. 13, and P15 and P16 of Fig. 14. These tubes are also indicated at P101.1 and P101.2 of Fig. 15, as part of the multiplier circuits 101.3, 101.4 that are mentioned above with reference to Fig. 7.

The mechanical equipment of a practical embodiment that is shown in Figs. 9 to 12 varies from the embodiment that is schematically indicated in Fig. 7. The latter is somewhat more exact than that now to be described which however is less expensive while sufficient for many purposes.

In Fig. 9, numeral 80 denotes a frame work of customary design which carries, on angle irons 80.1 and 80.2, the mapping surface support 61 mentioned above with reference to Fig. 7, with the mapping sheet 62. The beams 80.5 and 80.6 support guide rods 81.1 and 81.2 which are located in the $y$ direction, and which support heads 82 only one of which is visible in Fig. 9. One of these heads contains in conventional manner a nut for the $y$ direction lead screw 83 which is rotatably fixed to the frame work. The heads 82 support two $x$ direction guide rods 84.1 and 84.2 on which slides a head 85 with a platform 85.1. A lead screw 86 runs in a nut of head 85 and is rotatably fixed to one of the heads 86. The movement in the $z$-direction is provided by a lead screw 91 engaging a nut member 92 which is fastened to the fine scanning head 50, that runs on track 93 fastened to the head 85.

These motions are controlled by electric motors which rotate the corresponding $x$, $y$ and $z$ lead screws. The $z$ motor is operated manually to adjust the scanning level 23 to the desired elevation. The $y$ motor can be reversed by the action on a switch of two adjustable stops each time the carriage reaches one or the other end of the desired $y$ excursion. The $x$ motor is activated momentarily every time the $y$ motion reaches either end of its excursion to displace the carriage 82 a few hundredths of an inch in the $x$ direction. Thus while the scanning bar, which will be described presently, vibrates rapidly in the $x$ direction, the carriage 85 which supports the scanning head moves continuously in the $y$ direction until it reaches either end of its excursion, when the direction of motion is reversed and the carriage is indexed in the $x$ direction. When, at the end of the excursion in $x$, the whole desired area has been scanned, the motors are switched off and the operator adjusts the level of the scanning head 50 to a new elevation.

Automatic scanning with a practical machine of this type produces an $x$—$y$ presentation at constant $z$ with the scanning holes moving back and forth along the $y$ axis at 0.37" per second, and along the $x$ axis from left to right in $\frac{1}{32}$" incremental steps whenever a reversal in the $y$ movement occurs. One slow $x$—$y$ scan covering the desired portion of the diapositive images is taken for each elevation, and a series of such runs at different elevations furnishes adequate elevation information to establish a family of contour lines.

The fine scanning device is in this instance constructed as follows.

The scanning head 50 carries a plate 50.1 to which is fastened the above mentioned septum or dividing wall 51 and which has a slot 50.2 with recesses 50.3 (Figs. 9 and 11) which carries a slide bar 52 of light weight material such as Mycarta, and having recesses 52.3, that is supported within the slot 50.2 by means of rollers 52.1 (Fig. 11). The upper face of the slide bar 52 is flush with the surface of the table 50.1 in which position it is further secured by means of strips 52.2. The surfaces of bar 52 and of table 50.1 constitute the scanning surface 23 whose function is explained above with reference to Fig. 7. The bar 52 has the scanning holes which in this practical embodiment are 0.01 inch in diameter.

As shown in Fig. 12, the bar 52 is driven by means of a crank arrangement consisting of a disk 54 carrying an eccentrically arranged roller 54.1. The disk 54 is fastened to a shaft 55 that is driven by suitable means such as the motor 56 which in this embodiment rotates at 60 revolutions per second, vibrating the bar 52 at that rate.

It will now be evident that this device oscillates the holes 23.1, 23.2 such that the phototubes P11 and P12 will scan the image on the path indicated in Fig. 8, receiving an optical signal which they convert photoelectrically into an electrical signal wave.

This mechanical arrangement can be replaced by an electro-optical arrangement such as will be described hereinbelow with reference to Figs. 13 and 14.

The carriage 85 also guides a scriber over the metal plate 61 mounted horizontally under the scanning carriage, as above described. A sheet of Teledeltos or other fascimile paper, on which the contours are to be drawn, is mounted on the plate. When an electric current is passed through the paper between the scriber and the metal plate 61, a mark is inscribed on the paper. A series of such marks defines a contour.

The electrical equipment of the embodiment described consists of the component circuits which are shown in detail in Figs. 15 to 17. Fig. 15 discloses the photomultiplier, cathode follower, and filter circuits 101, 102 and 103. Fig. 16 shows the automatic gain control amplifiers 104. Fig. 17 shows the dividers 105 and 106, the subtractor 107, the amplifier 108, the rectifier 109, the oscillator 110, the timers 111, and the control and marker tube circuits 114 and 115. It will be evident that the circuits 101, 102, 103, and 104 occur in pairs and are connected as clearly indicated by the legends that are applied to the input and output terminals of the circuit diagrams Figs. 15 to 17.

The nature and electrical connections of the elements of each of these circuit components are clearly shown in Figs. 15 to 17, whereas the exact structural characteristics or dimensions and ratings so far as material for the proper operation of the device are identified in the following list which refers to the numerals of the figures, it being understood that adjustments and mutual correlations have to be applied upon initial testing for proper performance, according to routine practice in the manufacture of devices of this type.

*Photo multipliers 101.3 and 101.4*

Tubes:
   P101, each _____ RCA–6199

Resistors:
   r1 _____ 17K
   r2 to r11 each _____ 22K
   R1 _____ 330K

*Cathode followers 102.1 and 102.2*

Tubes:
   V1.1 and V1.2, each ½ of _____ 12AU7

Resistors:
   R2 _____ 3.9K
   R3 _____ 15K
   R4 _____ 5M

Capacitors:
   C1 _____ 0.1
   C2 _____ 0.02

*Filters 103.1 and 103.2*

Resistor:
   R5 _____ 12K

Capacitor:
   C5 _____ 0.05

*Automatic gain control amplifiers 104.1 and 104.2*

Tubes:
   V2, V3, V4, V5, each _____ 6BA6
   V6, V9, each ½ of _____ 12AU7
   V7.1, V7.2 and V9.1, V9.2 each ½ of ____ 6AL5

Resistors:
   R6, R7 _____ 6.8K
   R8 _____ 2.2K
   R9, R10, R11 _____ 22K
   R12, R13, R14 _____ 15K
   R15 to R22 _____ 10K
   R23 to R27, R33 _____ 1M
   R28 to R32 _____ 100K
   R34 to R36, R6.1 _____ 1K
   R37, R38 _____ 91K
   R39, R40 _____ 188K
   R41 to R44 _____ 270K
   R45 to R48 _____ ohms__ 150
   R49, R50 _____ do____ 470

Capacitors:
   C6 to C13 _____ µf__ 0.1
   C14 to C17 _____ µf__ 0.25
   C18 to C19 _____ µf__ 16
   C20, C21 _____ µf__ 0.05
   C22 to C25 _____ µf__ 0.01
   C26, C27 _____ f__ 0.004
   C28 _____ f__ 20

*Balanced divider 105*

Resistors:
   R51, variable _____ 250K
   R52 _____ 250K

*Fixed divider 106*

Resistors:
   R53 _____ 100K
   R54 _____ 390K

*Subtractor 107*

Tubes:
   V55 _____ 12AU7
   V56 _____ 6AU6

Resistors:
   R55, R56 _____ 27K
   R57, R58 _____ 10K
   R59 _____ ohms__ 220
   R60 _____ 5M Capacitor:
   C55 _____ f__ 0.1

*Amplifier 108*

Tube:
   V61 _____ 12AT7

Resistors:
   R61, R62 _____ 22K
   R63, R64 _____ ohms__ 560
   R65 _____ 1.8M
   R66 _____ 150K Capacitor:
   C61 _____ f__ 0.05

*Rectifier 109*

Tubes:
   V67.1 and V67.2, each ½ of _____ 6AL5

Resistors:
   R67, R68 _____ 100K
   R69 _____ 120K
   R71, R72 _____ 220K
   R73 _____ 820K Capacitors:
   C67, C68 _____ f__ 1.0

*Oscillator 110*

Tubes:
   V81.1 and V81.2, each ½ of _____ 12AT7

Ammeter:
   A81 _____ µa__ 0 to 25

Resistors:
R81 --- 1K
R82 --- 220K
R83 --- 10K
R84 --- 390K
R85 --- 4.7K
R86 --- 560K Capacitors:
C81, C82 ---f--- 0.1
C83 ---f--- 0.001
C84 ---μμf--- 6800

Inductor:
L81, iron core ---kc--- 10 to 20

*Longtime integrator 111.1*

Resistors:
R74 --- 0.5M
R75 --- 2.2K
R76 --- 1M

Capacitor:
C74 ---f--- 0.02

*Short time integrator 111.2*

Resistors:
R77 --- 820K
R78 --- 220K

Capacitor:
C77 ---f--- 0.001

*Control tube circuit 114*

Tube:
V87 --- 6AS6

Resistors:
R87.1 --- 10K
R87.2 --- 15K
R88 --- 270K
R89 --- 1M
R91 (writer gain) --- 5M Capacitors:
C87 ---μμf--- 100
C88 ---μμf--- 1500

*Marker tube circuit 115*

Tube:
V92 --- 6AQ5

Resistors:
R92 --- 220 ohms
R93 --- 50K, 5 watt

Capacitors:
C92 ---μμf--- 100
C93 ---f--- 1.0

Transformer:
T92 --- UTC–S18

THE OPERATION

As above described, the light rays coming from the lamp systems of the projectors 22 pass through the scanning holes 23 of the scanning bar 52 and fall on the faces of two multiplier phototubes P101. To insure that good information is supplied by the optical system, the two scanning holes must be accurately aligned to corresponding areas on the two diapositives. After inserting the diapositives in the projectors and turning on the power for the various electrically operated components, the diapositives in the projectors are centered for example by adjusting them so that principal points such as crosses of the photograph coincide with principal points such as dots of projectors. By means of the z drive the platen 52 is adjusted for location in a plane of elevation and the images and the scanning holes are aligned according to conventional methods.

The multiplier phototubes P101 convert all impinging light to voltage, and as the scanning bar 52 moves continuously with respect to the two diapositive images, two continuously varying output voltages are produced by the contrasting light increments falling on the phototubes through the holes 23.1 and 23.2, respectively. Thus, the varying light intensities affecting the photoelectric cathodes 101.1, 101.2 cause varying voltages to appear across the resistors R1 in the plate circuits of the photomultiplier tubes. Corresponding variations of these voltages appear on the grids and cathodes of the tube components V1.1, V1.2 of the cathode follower circuits 102 of Figures 7 and 15. The conventional low pass filters 103.1 and 103.2 with resistors R5 and capacitors C5, in the output circuits of the cathode followers of Figure 15, are designed to pass the electric variations in the desired frequency range but to attenuate those of unusually high frequency, permitting only that portion of the frequency spectrum containing most of the useful information to pass through them. These filters also remove noise voltages.

The signals of both channels coming from the filter circuits 103.1, 103.2 are amplified in identical amplifiers 104.1, 104.2 with automatic gain control in order to hold the A.C. output amplitudes to constant levels. Before the two signal waves can be properly compared, these amplifiers with automatic gain control are required to bring the average amplitude of the variations of the signals to approximately constant and equal levels. The reason for this requirement is that, due to differences in lighting, distances and angles from the camera, and due to unavoidable effects of the photographic processes, the variation of light intensity of corresponding elementary areas in the two projected images may vary greatly in magnitude even though the two elementary areas correspond to a single elementary area in the photographed terrain.

The two pairs of cascade amplifiers 104.1 and 104.2 with automatic gain control, of Fig. 7, are identical; one of them is shown in detail in Figure 16. The first cascade amplifiers comprise the tubes V2 and V3 and the impedance components associated therewith, and its automatic gain control which consist of the tubes V6.1, V6.2 and the tubes V7.1, V7.2 and their associated components. The second cascade amplifier with tubes V4, V5 and V9.1, V9.2; V11.1, V11.2 is similar in design and operation to the first of the cascade amplifiers and its automatic gain control. It is thus convenient to consider only the operation of the first amplifier and its automatic gain control as shown in the left half of Figure 16. The two tubes V2 and V3 with their associated components constitute conventional resistance coupled amplifiers. These tubes however are remote cut-off pentodes of the type 6BA6 and have the characteristic that their gains and amplification factors decrease uniformly with increasing negative bias on the grid circuits. The automatic gain control circuit operates to vary the negative bias of the two amplifiers in such a way that whatever the level of the input signal may be the average output signal tends to seek a constant level. The input signal after amplification in the first, type 6BA6, stage of amplification is further amplified by the triode amplifier V6.1, the first half of a 12AU7 tube. The amplified signal which normally has an irregular wave form is converted by a phase inverter V6.2, the second half of this 12AU7 tube, into two signals, one similar to the original irregular wave form and the other having an equal but opposite wave form, the two being mirror images. These equal and opposite waves are rectified by the action of the double diode tube V11 of the type 6AL5, to produce a negative bias that is simply related in value to the amplitude of the input signal. This negative bias in turn is applied in well known manner through the associated resistors and capacitors, which determine the time constant of this circuit, to the grids of the V2, V3 amplifiers and so regulates the level of the output signal as averaged over the appropriate time constant. The action of the second amplifier with its automatic gain control tends further to regulate the level of the average of the output signal. Although the average outputs of the two automatic gain control amplifiers 104.1 and 104.2 (Fig. 7) are essentially constant, the two output levels are not necessarily equal. Therefore provision is made for balancing these levels by means of the fixed voltage divider 106 consisting of the resistor R53 in series with the resistor R54, together with the manually balanced divider 105, consisting of the potentiometer R51 in series with the resistor R52.

At this stage the signals can be monitored by an electronic sweep unit or switch 119 which portrays at the same time both the signals from both channels on an oscilloscope. If the circuits are operating properly, and similarly shaped voltage wave-forms corresponding to matched signals are fed into the two amplifiers 104.1, 104.2, the two waves will fall on top of each other and appear as one on the face of the oscilloscope, in accordance with well known principles and procedures of circuit alignment and testing.

After the average amplitudes have been so stabilized and equalized their instantaneous values are compared in the subtractor circuit 107 to determine whether the wave forms are similar, and whether the two elementary scanned image areas thus correspond to a single area in the photographed terrain. The subtractor circuit consists of the 6AU6 pentode V56, the 12AU7 double triode V55, and the associated resistor and capacitor components shown in Figure 17. The pentode V56 when operated as shown has the characteristic of maintaining a current flow which is independent of the voltage across the tube. Since the current through the pentode V56 is essentially constant, the sum of the current through the two triodes V55 must also be constant and if a positive signal on the grid of one triode causes an increase in the current through that triode it must cause a corresponding decrease in the current through the other triode. Thus, over a relatively wide range of voltage the instantaneous output of the subtractor circuit 107 is proportional to the difference between the voltages impressed on the grids of the two triodes V55.

A low instantaneous output of the subtractor circuit 107 indicates that the wave forms are at that instant similar; a continued low output of the subtractor circuit indicates that the wave forms from two simultaneously scanned areas in the projected images are similar and that therefore these two scanned areas probably correspond to a single elementary area in the photographed terrain and lying at an elevation corresponding to the elevation of the scanning head.

To detect electronically a continued low output of the subtractor, the output signal of the latter is amplified in a conventional balanced amplifier or phase inverter indicated at 108 of Figure 7 and shown in detail in Figure 17.

The two resulting equal and opposite signals are rectified in the circuit 109 that includes the double diode type 6AL5 tube V67.1, V67.2, to produce a negative bias.

The difference signal is thus amplified and full-wave rectified into negative pulsating D.C. voltage. Since either positive or negative voltages can pass through a full-wave rectifier and emerge as a wave of single polarity, the information received from the subtractor is always fully utilized. The pulsating D.C. voltage will vary instantaneously in amplitude according to the degree of match observed by the subtractor. However, this instantaneous information cannot be used for matchmaking decisions since false matching information would result twice during each complete rapid scan, that is, when the scanning holes are stationary and consequently are providing no information while reversing direction at the ends of their travel. Also, the difference voltage coming from the subtractor before rectification is essentially an A.C. type and must cross over from positive to negative polarity and vice versa. During these times there is no difference signal; and consequently false match marks would again result. In addition, the wave configurations themselves are subject to false matching and mismatching.

Experience and theoretical considerations have demonstrated that the probability of correctly identifying a pair of elementary scanned areas as corresponding to a single elementary area in the photographed terrain is enhanced if the output of the subtractor is required to be low for both a short period of time and a relatively long period of time before a contour mark is inscribed on the recording paper.

The above mentioned theoretical considerations on which this mode of operation is based in accordance with an important aspect of the invention, involves certain concepts which will be defined as follows, for present purposes.

Time dependent signals are signal waves such as the voltage-time signal obtained by linearly scanning a detailed photographic image.

False matching is a phenomenon resulting from the fact that the device will accept as correct, for recording, two time dependent signals that actually correspond to two different elementary terrain areas.

True matching is a phenomenon resulting from the fact that the device will accept, as correct for recording, two time dependent signals that actually correspond to the same elementary terrain area; in actual practice true matching does not always occur for every pair of time dependent signals that do correspond to an elementary terrain area; a certain amount of mismatching can occur and may be tolerated under certain conditions.

Mismatching of time dependent signals occurs when the two time dependent signals stem from the same elementary terrain area, but when the photographic records of that terrain area do not sufficiently well coincide.

The threshold is arbitrary, and variably selected according to the definition and contrast properties of the images, as dependent from the character of the terrain, and as affected by the taking, copying and projecting techniques.

With these definitions in mind, the following generally valid observations can be applied to the present scanning situation as follows.

The probability of two independent events occurring simultaneously is less than the probability of either of these independent events occurring by itself. Therefore, the probability of false matching, when the latter effect is random, is decreased by making at least two independent requirements on the comparison of two time dependent signals before delivering a final actuating impulse to the recording circuit. In the above described mode of operation, the conditions for obtaining a final actuating impulse can be considered, under proper adjustment, to represent two independent requirements namely that an integration over a long time interval be below a certain threshold, and that integration over at least one subdivision thereof be less than a second threshold. These thresholds are selected with reference to the detail and contrast of the photographic images, as affected by the taking, copying and projecting procedures. The marking device is actuated by a final actuating impulse which occurs only on concurrent satisfaction of the above requirements, namely that both integrations be below their respective thresholds.

In the device described above with reference to Figs. 7 to 12 the fine scanning path is linear and in the above described mode of operation the long time integration can cover a single scanning stroke, or several strokes or any fraction thereof. The integration intervals are determined by the electrical dimensions of the long time integration (LTI) and short time integration (STI) circuits 111.1 and 111.2 (Fig. 7) which determine the spatial extent of the integration paths and are adjusted to the given construction and mode of operation of a scanning device, for example the stroke and speed of the scanner according to Figs. 9 to 12.

The long time and short time integrating circuits meet the above requirements by means of the 6AS6 tube V87 of the control tube circuit 114, the resistor and capacitor elements of circuits 111.1 and 111.2 being associated with two of the control grids of this tube V87. The 0.02 f. capacitor C74 and the resistors R74, R75 and R76 define the long time constant of 111.1 on grid $g7$. The 0.001 f. capacitor C77 and the resistors associated therewith define the short time constant of 111.2 on grid $g1$.

A sine wave signal in the frequency range of 10–20 kilocycles per second from the oscillator is applied to the grid $g1$ of the controlled tube V87. This signal is amplified at the plate of this controlled tube and thus operates the marking tube of circuit 115 with the 6AQ5 tube V92 only if the rectified output from the subtractor circuit 107 as integrated over both a long period and a short period of time is below a given threshold. The amplified outputs from the control tube and the marking tube are fed into the scriber 63.

The control tube V87 is thus simply a valve which regulates the passage through it of high frequency sine wave voltage from the 10–20 kc. oscillator 110, depending on the D.C. amplitudes of the long and short time constant comparison voltages. The amount of high frequency voltage which arrives at the grid of the marker tube V92, and subsequently the energy which arrives at the marking paper surface, is dependent on the decision of the control tube and upon the manual writer gain control which is provided in the marker unit 115 at R91, to adjust the blackness of the marks which are made by the marker needle on the recording surface. If the latter is a paper of the Teledeltos type, black marks are made thereon by burning through the thin grey insulation surface to the black conducting surface underneath.

From the foregoing description, it will be seen that, if the platen 23 with the scanning bar 52 and the holes 23.1 and 23.2 is so situated in relation to the projectors and diapositives that identical or nearly identical light patterns are introduced through the scanning holes, a mark will result in the paper and that, conversely, dissimilar light patterns will not permit a mark to be made.

The complete operation of the above described circuitry can be summarized as follows:

(1) The D.C. components are removed from the photomultiplier outputs;
(2) Two comparable wave signals are formed by
  (a) amplifying the voltage wave from the multipliers,
  (b) rectifying the amplified signal,
  (c) averaging the rectified signal over a running time constant period,
  (d) controlling the gain of (a) with the output of (c), thus
  (e) obtaining as end output of (a) two irregular voltage waves having approximately constant, average amplitudes; thereupon
(3) The two amplified voltage waves are
  (a) correlated with a fixed voltage divider for one wave and a manually adjustable balance divider for the other wave, thus adjusting the waves to the same level,
  (b) the difference of the instantaneous voltages is taken,
  (c) the subtractor output is amplified,
  (d) the amplified output signal is full wave rectified to obtain an absolute value, and
  (e) the rectified signal is integrated in two separate parallel branches over running time constants of different (short and long) magnitudes; and
(4) The marker is energized when signals from both (short and long) branches fall below a threshold limit given for each.

MODIFICATIONS

As pointed out above, the gross scanning movements in the $x$, $y$ and $z$ directions can be carried out in various ways; one practical embodiment has been described in detail with reference to Figs. 9 to 12, and another, more exact embodiment has been outlined with reference to Fig. 7.

The fine scanning movement can be performed by mechanical means such as described with reference to Figs. 9 to 12. Instead, the fine scanning can be accomplished with light beams that are moved in the scanning paths by optical and electrical rather than purely mechanical means, and two embodiments of this type will now be described with reference to Figs. 13 and 14. As shown in these figures, these fine scanning devices are particularly suited for mapping devices wherein two optically differentiated images are projected into the same space, as described above with reference to Figs. 3 and 5, and they are also particularly useful for fine scanning in patterns of the type shown in Fig. 18. However the apparatus according to Figs. 13 and 14 can be easily adapted for scanning of separated images according to Figs. 6 to 12, and for straight line scanning such as illustrated in Fig. 8.

Referring now to the embodiments illustrated in Figs. 13 and 14, these devices have image plane selecting frosted glass plates 223, which correspond to the platen 23 of Figs. 7 to 12. Light coming from this image plane is directed towards the phototubes by collimator or microscopical optical systems which define an optical aperture or stop and select narrow scanning beams of light proceeding from elementary areas of the image plane and direct them into the photoelectric devices by means of electrically moved mirror systems.

Referring now particularly to Fig. 13, this scanner has the above mentioned frosted glass plate 223 corresponding to the image surface 23 of Fig. 7. Below this plate 223 is fixed an annular mirror 224, and below that mirror is movably supported a roof-shaped mirror 225 which can be rotated about two intersecting axes by means of four magnetic fingers 226.1 to 226.4 that correspond to four actuating coils 227.1 to 227.4. The roof mirror 225 is mounted on a horizontal frame work (not shown for the sake of simplicity) made from beryllium-copper spring wire shaped in the form of gimbals so that the mirror is free to oscillate simultaneously about the two above mentioned horizontal axes normal to each other, with elastic restoring forces. Alternating magnetic fields are exerted by the coils 227 upon the fingers 226 which are light weight magnets, in order to vibrate the mirror 225 about these two axes. Alternating current of appropriate frequency and phase relationship is supplied by conventional means to the coils 227, to produce a desired pattern of vibration in known manner.

The phototubes P11 and P12 scan the images in the surface 223 by means of the conventional optical collimator or microscope systems 71.1 and 71.2, by way of reflection at mirrors 224 and 225 as clearly indicated in Fig. 13. If, as assumed with regard to Fig. 13, the two images projected from apparatus 22.1 and 22.2 are superimposed as in Fig. 5, instead of pulled apart as in Fig. 6, these images are differentiated in conventional manner by means of color filters or polarizers. Each phototube then receives only the light from its respective image, by means of image differentiating color filters or analyzers 229.1 and 229.2.

Fig. 14 again shows the image surface 223 but also the projectors 22.1 and 22.2, equipped with color filters or polarizers 231.1 and 231.2 and projecting the respective images into the same space. Below the plate 223 are arranged two galvanometer mirrors 231 and 232. The mirror 231 can be made to oscillate about a horizontal axis by means of a galvanometer movement 231.1, and the mirror 232 can be made to rotate about a vertical axis by means of a galvanometer movement 232.1. The two images are separated by means of a thinly silvered mirror or optical interference coating 233 which divides the beam coming from mirror 232 in two component beams directed towards phototubes P15 and P16 respectively.

If a silver mirror is used, both component beams will contain light from both images, so that each phototube has an appropriate filter or analyzer 234.3 and 234.4, respectively. The optical apertures of the two collimator or microscope systems 71.3 and 71.4 define two narrow beams of light that are caused to scan the frosted glass plate by means of the oscillating movements 231.1, 232.1 of mirrors 231 and 232 respectively. These galvanometer movements are actuated in conventional manner by electrical signals impressed on their coils to produce a predetermined pattern such as the closed curve pattern according to Fig. 18, with a proper repetition frequency such as 600 per second.

Scanning patterns of the type illustrated in Fig. 18 are often preferable to linear scanning patterns. The method according to the invention which involves such intersecting patterns will now be described.

When conditions require a greater discrimination between areas which lie on the same contour and those which do not, than the discrimination which can be obtained with the above described linear scanning system under any possible application of the above described system, the following fine scanning procedure is preferred.

The pattern according to this method is comprised ideally (but not necessarily under all practical conditions) of a set of lines intersecting at the central point of the fine scanning area, all the angles subtended at the point of intersection by adjacent lines being preferably equal, such that the number of lines in the set is not so large that in consideration of the optical discrimination of the system two adjacent scans yield essentially the same information over more than a certain fraction of their length. Information obtained from such a scanning pattern has the advantage of originating from the smallest neighborhood of the center of the fine scanning pattern that can be realized for a given amount of information, except for other multiple line patterns (such as a multiple parallel line fine scanning pattern based on an extension of the system above disclosed with reference to Figs. 8 and 9 to 12) which are less easily realizable in practice.

The preferred practical realization of the general type of intersecting line pattern consists of "daisy" patterns such as illustrated in Fig. 18, in which the above described intersecting line pattern is supplemented by sufficient curvature in each line and sufficient curved extension to each line such that the pattern becomes that of a geometric figure with continuous perimeter and closely approximating an intersecting line pattern, with the exception of closed loops in the region of the fine scanning area farthest from the center.

A decrease in the probability of false matching which would result from the comparison of a signal integrated over the entire perimeter of the "daisy" pattern with a certain threshold alone can be effected by the adoption of the previously described method of integrating separately over long and short intervals. If it is required in accordance with that method that the integrated difference signal resulting from at least one single stroke of the "daisy" pattern be less than a certain threshold, concurrently with the requirement that the integrated difference signal resulting from the entire daisy scan, for example, be less than a second threshold, in a final actuating signal for purposes of recording the relative position of the center of the fine scanning pattern, then the probability of false matching is decreased in the manner in which such probability decreases upon imposition of two independent requirements as previously described, when such false matching is random.

While scanning devices of the type illustrated in Figs. 13 and 14 are especially useful to produce the above discussed patterns of the type of Fig. 18, it will be evident that they can be easily adopted for single or multiple non-intersecting line scanning, by appropriately correlating the electrical signals that energize the coils 227 of Fig. 13 or the movements 231.1 and 232.1 of Fig. 14.

It will also be evident that a separate movement of this type can be used for each one of two images if they are spatially separated according to Figs. 6, 7 and 9 to 12. In that case light differentiating components such as filters or analyzers are of course unnecessary.

It should be understood that the present disclosure is for the purpose of illustration only and that this invention includes all modifications and equivalents which fall within the scope of the appended claims.

We claim:

1. A device for comparing the detail, optically scanned on geometrically coincident paths through two elementary areas of two geometrically corresponding photographs of an object, which comprises: two photo-electric detecting means, one for each of said paths, for quantitatively detecting detail within said elementary areas consecutively presented to them, by converting said detail into the configuration of an electric signal wave for each path; two electrical transmission means, one for each of the two detecting means, for delivery by said transmission means of respective electrical signal waves representing the variations of the detail pattern presented to the respective detecting means, as referred to a reference amplitude, each transmission means including means for adjusting the amplitudes of the respective signal waves to said reference amplitude dependent on the signal wave amplitudes as continuously integrated over a time interval that is substantially equal for both signal waves, means for continuously comparing said detail pattern signal waves to derive therefrom a single comparison wave signal; and energizing means controlled by said comparison wave signal for delivering an electrical impulse when said comparison wave signal is within a predetermined range of allowable deviation; whereby said impulse indicates essential similarity of said detail.

2. A device for comparing the detail, optically scanned on geometrically coincident paths through two elementary areas of two geometrically corresponding photographs of an object, which comprises: two photo-electric detecting means, one for each of said paths, for quantitatively detecting detail within said elementary areas consecutively presented to them, by converting said detail into the configuration of an electric signal wave for each path; two electrical transmission means, one for each of the two detecting means, for delivering respective electrical signal waves representing the variations of the detail pattern presented to the respective detecting means, as referred to a reference amplitude; means for continuously comparing said detail pattern signal waves to derive therefrom a single comparison wave signal; and energizing means controlled by said comparison wave signal for delivering an electrical impulse when said comparison wave signal is within a predetermined range of allowable deviation, said energizing means including means for deriving from said comparing means two individual actuating impulses and for selectively delivering only that part of each actuating impulse that is below a predetermined threshold; whereby said impulse indicates essential similarity of said detail.

3. A device for automatically plotting topographical contour lines from two geometrically related photographs of terrain to be mapped with the aid of optical means for projecting images of said related photographs in such positions of photographs and projected images that the geometrical relation of each photograph as originally exposed and the terrain depicted thereon, is reproduced by each image and the photograph from which it is projected, comprising: two scanning means, one for each image, and each having an optical aperture means; means for placing each optical aperture means in a position relatively to the other aperture means and to the image that is scanned by the respective aperture means, such that each pair of simultaneously scanned elementary image areas corresponds as to detail pattern to an elementary area of the terrain if said elementary areas define a given contour plane; means for relatively adjusting said images and said aperture means to define a selected contour plane; means for gross scanning said images by relatively moving the aperture means while remaining in said relative position to each other, and the respective images, in two directions of the image plane; means for fine scanning small image areas by a movement of the aperture means which movement congruently covers said areas and is superimposed on said gross scanning movement; plotting means coupled to said gross scanning means for marking selected points on a mapping surface; two photoelectric detecting means, one for, and juxtaposed to, each of said aperture means, for quantitatively detecting the image detail pattern consecutively presented to them by the aperture means, by converting said detail pattern into the pattern of an electric signal wave; two electrical transmission means, one for each of the two detecting means, for delivering respective electrical signal waves representing the variations of image detail pattern presented by said aperture means during said gross and fine scanning movements as referred to an average amplitude; means for continuously correlating said signal waves; and means controlled by said correlating means for energizing said plotting means upon cognizance by said correlating means of similarity of said signal waves; whereby said plotting means marks on said mapping surface points that correspond to elementary areas that occur on both images and correspond to a terrain area in a given contour plane and hence, together with similarly marked points, depict the contour in said plane.

4. Device according to claim 3 wherein said gross scanning means and said fine scanning means move in intersecting planes.

5. Device according to claim 3 wherein said gross scanning means and said fine scanning means move in the same plane.

6. Device according to claim 3 wherein said fine scanning means traces a closed curve that intersects itself within said elementary image area.

7. Device according to claim 3 wherein said fine scanning means includes a slide with two holes that constitute said optical aperture means, and means for vibrating said slide.

8. Device according to claim 3 wherein said fine scanning means includes optical means for forming an apertured scanning beam, and movable optical reflecting means in said beam for moving it over said image areas.

9. A device for automatically plotting topographical contour lines from two geometrically related photographs of terrain to be mapped, comprising: optical means for projecting images of said related photographs in such positions of photographs and projected images that the geometrical relation of each photograph as originally exposed and the terrain depicted thereon, is reproduced by each image and the photograph from which it is projected; two scanning means, one for each image, and each having an optical aperture means; means for placing each optical aperture means in a position relatively to the other aperture means and to the image that is scanned by the respective aperture means, such that each pair of simultaneously scanned elementary image areas corresponds as to detail pattern to an elementary area of the terrain if said elementary areas define a given contour plane; means for relatively adjusting said images and said aperture means to define a selected contour plane; means for gross scanning said images by relatively moving the aperture means while remaining in said relative position to each other, and the respective images, in two directions of the image plane; means for fine scanning small image areas by a movement of the aperture means which movement congruently covers said areas and is superimposed on said gross scanning movement; plotting means coupled to said gross scanning means for marking selected points on a mapping surface; two photoelectric detecting means, one for, and juxtaposed to, each of said aperture means, for quantitatively detecting the image detail pattern consecutively presented to them by the aperture means, by converting said detail pattern into the pattern of an electric signal wave; two electrical transmission means, one for each of the two detecting means, for delivering respective electrical signal waves representing the variations of image detail pattern presented by said aperture means during said gross and fine scanning movements as referred to an average amplitude; means for continuously correlating said signal waves; and means controlled by said correlating means for energizing said plotting means upon cognizance by said correlating means of similarity of said signal waves; whereby said plotting means marks on said mapping surface points that correspond to elementary areas that occur on both images and correspond to a terrain area in a given contour plane and hence, together with similarly marked points, depict the contour in said plane.

10. In a device for comparing two time dependent signals obtained by scanning elementary areas of two detailed photographic images on linear paths, apparatus for reducing the probability of false matching which comprises: means for deriving a combination signal by continuously comparing said time dependent signals; means for integrating said combination signal over a long scanning time interval as well as over at least one subdivision thereof; means for comparing each of said integrated signals with a threshold selected for said integrated signal, respectively; means for deriving from said comparing means two respective individual energizing impulses by selectively transmitting only that portion of each integrated signal which is below its respective threshold and means for selectively deriving from said energizing impulses an actuating impulse delivered upon concurrent transmission of said energizing impulses.

11. A device for comparing two detailed images, comprising: means for scanning elementary areas of said images on paths which include lines that intersect within said areas; means for deriving from the image detail on said paths two time dependent signals; means for deriving a combination signal by continuously comparing said time dependent signals; means for integrating said combination signal over a long scanning time interval as well as over at least one subdivision thereof; means for comparing each of said integrated signals with a threshold selected for said integrated signal, respectively; means for deriving from said comparing means two respective individual energizing impulses by selectively transmitting only that portion of each integrated signal which is below its respective threshold; and means for selectively deriving from said energizing impulses an actuating impulse delivered upon concurrent transmission of said energizing impulses.

12. Device according to claim 11 wherein said scanning means includes means for tracing said paths as self-intersecting closed curves.

13. Device according to claim 12 wherein said long time scanning interval is covered by said integrating means during a single course in said curve.

14. For comparing two time dependent signals obtained by scanning elementary areas of two detailed photographic images on linear paths, a method for reducing the probability of false matching which method comprises: continuously comparing said two time dependent signals to derive therefrom a combination signal; integrating said combination signal over a long scanning time interval as well as over at least one subdivision thereof; comparing each of said integrated signals with a threshold selected for said integrated signal, respectively; and deriving from said compared signals two individual actuating impulses such that each of said actuating impulses is delivered only if it is below its respective threshold.

15. The method according to claim 14 wherein said signal comparing step includes the selection of said thresholds with reference to the detail and contrast of said photographic images.

16. For comparing two detailed images a method which comprises: scanning elementary areas of said images on paths which include lines that intersect within said areas; deriving from the image detail on said paths two time dependent signals; continuously comparing said two time dependent signals to derive therefrom a combination signal; integrating said combination signal over a long scanning time interval as well as over at least one subdivision thereof; comparing each of said integrated signals with a threshold selected for said integrated signal, respectively; and deriving from said compared signals two individual actuating impulses such that each of said actuating impulses is delivered only under the condition that every compared signal is below its respective threshold.

17. Method according to claim 16 wherein in said scanning step includes the tracing of said paths in a self-intersecting closed curve.

18. Method according to claim 17 wherein said integrating step includes the coverage of said long time scanning interval during a single course in said curve.

References Cited in the file of this patent
UNITED STATES PATENTS

| | | |
|---|---|---|
| 2,283,226 | Porter | May 19, 1942 |
| 2,496,909 | Eberhard | Feb. 7, 1950 |
| 2,583,587 | Milsom | Jan. 29, 1952 |
| 2,626,989 | Brown | Jan. 27, 1953 |
| 2,716,189 | Ayres | Aug. 23, 1955 |